(12) United States Patent
Williams, III

(10) Patent No.: US 7,354,361 B2
(45) Date of Patent: *Apr. 8, 2008

(54) TENNIS STROKE TRAINING DEVICE

(76) Inventor: Raymond A. Williams, III, 4639 N. Lindhurst Ave., Dallas, TX (US) 75229

( * ) Notice: Subject to any disclaimer, the term of this patent is extended or adjusted under 35 U.S.C. 154(b) by 0 days.

This patent is subject to a terminal disclaimer.

(21) Appl. No.: 11/636,804

(22) Filed: Dec. 11, 2006

(65) Prior Publication Data
US 2007/0087868 A1  Apr. 19, 2007

Related U.S. Application Data

(63) Continuation-in-part of application No. 11/157,618, filed on Jun. 21, 2005, now Pat. No. 7,147,581.

(51) Int. Cl.
*A63B 69/38* (2006.01)
(52) U.S. Cl. ........................... 473/464; 473/459
(58) Field of Classification Search ........... 473/422, 473/458, 459, 461, 464, 553
See application file for complete search history.

(56) References Cited

U.S. PATENT DOCUMENTS

| 2,022,910 | A | * | 12/1935 | Hanley | 473/214 |
|---|---|---|---|---|---|
| 5,439,214 | A | * | 8/1995 | Dalbo | 473/461 |
| 5,476,257 | A | * | 12/1995 | Bobby | 473/464 |
| 6,514,163 | B2 | * | 2/2003 | Burns | 473/458 |
| 6,755,755 | B2 | * | 6/2004 | Wah Loh | 473/458 |
| 6,945,884 | B1 | * | 9/2005 | Korik | 473/464 |
| 7,147,581 | B1 | * | 12/2006 | Williams, III | 473/464 |
| 2002/0193188 | A1 | * | 12/2002 | Wah Loh | 473/458 |
| 2004/0018899 | A1 | * | 1/2004 | Thiruppathi | 473/464 |
| 2006/0073920 | A1 | * | 4/2006 | Kunsman | 473/464 |

\* cited by examiner

*Primary Examiner*—Raleigh W. Chiu
(74) *Attorney, Agent, or Firm*—David H. Judson

(57) ABSTRACT

A racquet stroke training device adapted to "fix" a user's forehand racquet stroke comprises, in one embodiment, a band adapted to be worn on a user's arm above the user's elbow, a glove adapted to be worn on a user's hand, and a tether having a first end attachable to the band and a second end attachable to the glove. The tether has (or is dimensioned to have) a given length such that, during a practice stroke, the user's elbow is bent at a substantially 90° angle and the user's wrist is fixed in an upwardly-extending, wrist-locked position.

5 Claims, 4 Drawing Sheets

TENNIS STROKE TRAINING DEVICE

This application is a continuation-in-part of Ser. No. 11/157,618, filed Jun. 21, 2005 now U.S. Pat. No. 7,147,581.

BACKGROUND OF THE INVENTION

1. Technical Field

The present invention relates generally to training devices for tennis and other racquet sports.

2. Background of the Related Art

Tennis training aids are well-known in the prior art. Representative patents include U.S. Pat. No. 3,937,465 to Roland, U.S. Pat. No. 4,150,821 to Racz, and U.S. Pat. No. 4,209,169 to Roberts. The Roland patent describes a device comprising a harness secured to the wearer's body and a cord that extends from the harness to the tennis racquet. The device is designed to assist the trainee in stroking the racquet in such a manner that the head of the racquet does not shift in a vertical plane below the trainee's wrist. The harness is adapted to be worn about the user's neck. The Racz patent describes a tennis training device to reduce the likelihood of the user developing tennis elbow. The device comprises a flexible strap that extends from a fitting on the head of the player's racquet to a member engaging the user's wrist. The strap establishes a desired angular relation between the player's arm and the longitudinal axis of the racquet. The Roberts patent describes another such device to facilitate the user's maintaining a proper grip on the handle of the racket. This device includes a wristband, a racket-handle band and inter-connectable strap segments separately attached to such bands for tethering the racket handle to the wrist, thereby forcing the player to hold the head of the racket above the wrist. This arrangement is also said to force the handle of the racket to assume a proper angle with respect to the player's forearm.

While these and other devices are useful and provide some advantages, there remains a long-felt need in the art to provide improved racquet stroke training aids, especially for forehand stroke training.

BRIEF SUMMARY OF THE INVENTION

A racquet stroke training device adapted to "fix" a user's forehand racquet stroke comprises, in one embodiment, a band adapted to be worn on a user's arm above the user's elbow, a glove adapted to be worn on a user's hand, and a tether having a first end attachable to the band and a second end attachable to the glove. The tether has (or is dimensioned to have) a given length such that, during a practice stroke, the user's elbow is bent and maintained at or near a substantially 90° angle with the user's wrist fixed in an upwardly-extending, wrist-locked position.

In one preferred embodiment, the training device has three (3) primary components: an adjustable band positioned on a user's arm above the user's elbow, a glove, and a means interconnecting the band and glove to maintain the user's wrist in a upwardly-extending, wrist-locked position with the user's elbow bent at or near a substantially 90° angle such that, during a practice stroke, the user's elbow remains in an elbow-bent position before, during and after contact with a ball. The interconnecting means typically comprises a fixed or adjustable length tether, cord, cable, strap, or the like, having one end attached, connected or secured to the glove (or to a fastener secured to or forming a part thereof), and an opposed end attached, connected or secured to the upper arm (or to a fastener secured to or forming a part thereof). This arrangement provides significant advantages in that repeated practice with the device improves the user's forehand stroke. In particular, the device conditions the user to maintain a proper and optimal racket alignment throughout the entire stroke. Further, another design and objective of using the training device is to train the user to produce forward rotation of the ball for better control. Forward rotation of the ball allows the player to achieve net clearance first, then to bring the ball down into play in the court.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
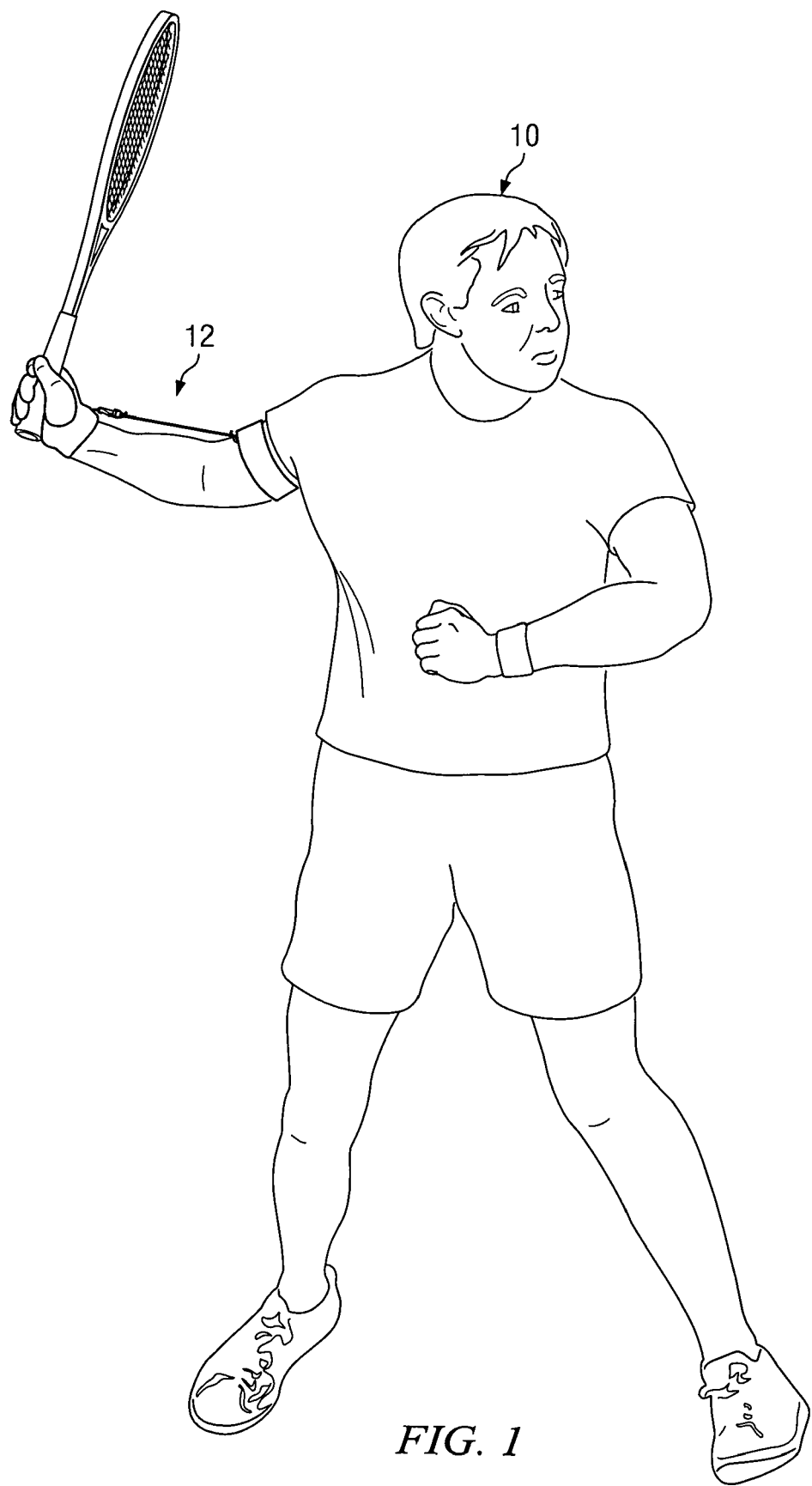
FIG. 1 is a view of a tennis player using the training device of the present invention with the user's arm in a first position at a start of a forehand stroke.
Figure 2:
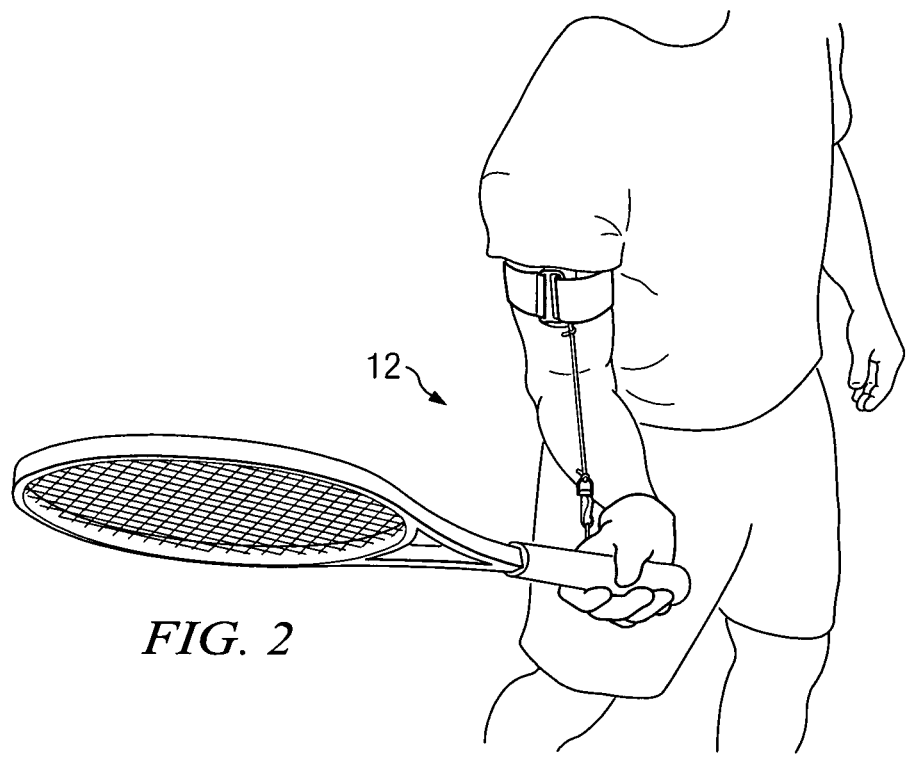
FIG. 2 is a view of the tennis player using the training device with the user's arm moving through the forehand stroke.
Figure 3:
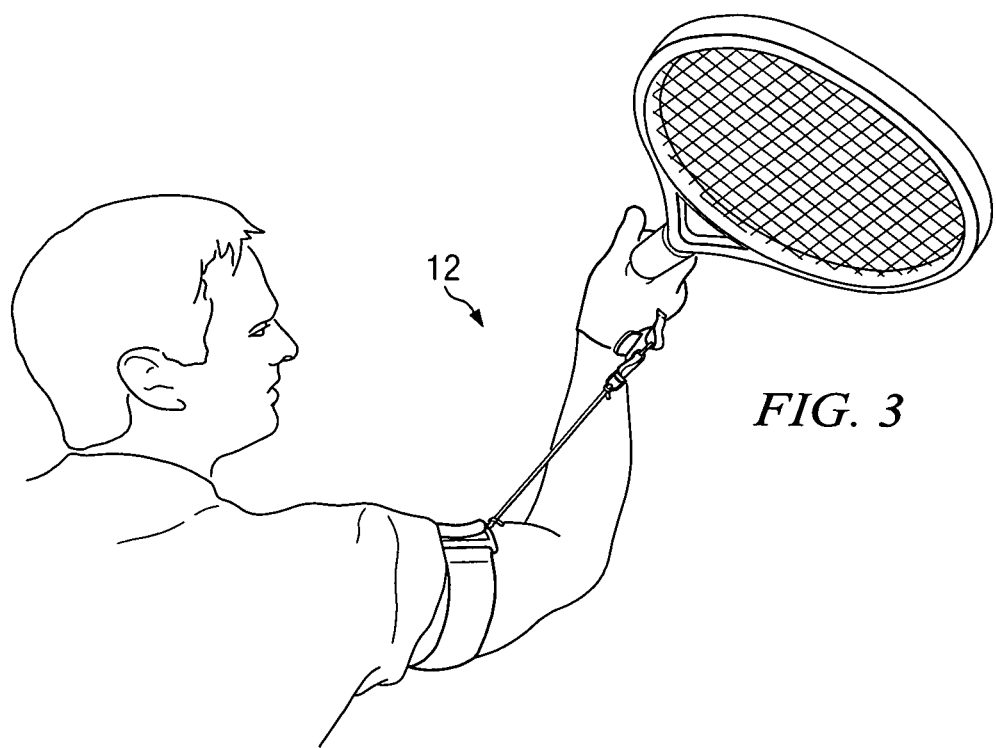
FIG. 3 is a view of the tennis player using the training device with the user's arm in a second position at the end of the forehand stroke illustrated in FIGS. 1-2.

FIGS. 1-3 illustrate a tennis player 10 using the training device 12 of the present invention through a complete forehand stroke. In particular, FIG. 1 illustrates the user wearing the training device 12 and having his arm in a first raised position at a start of a forehand stroke. FIG. 2 illustrates the user's arm moving through the forehand stroke, and FIG. 3 illustrates the user's arm at the end of the forehand stroke. As can be seen, throughout the stroke, the training device maintains the user's elbow bent and maintained at or near a substantially 90° angle with the user's wrist fixed in an upwardly-extending, wrist-locked position. This particular anatomical arrangement, namely, the bent elbow with the wrist in a wrist-locked position, is optimal for generating a precise and consistent forehand stroke. The training device works by requiring the user to maintain this anatomical arrangement during practice strokes when the device is worn so that the user will be conditioned to maintain a similar arrangement after the device is removed.

Figure 4:
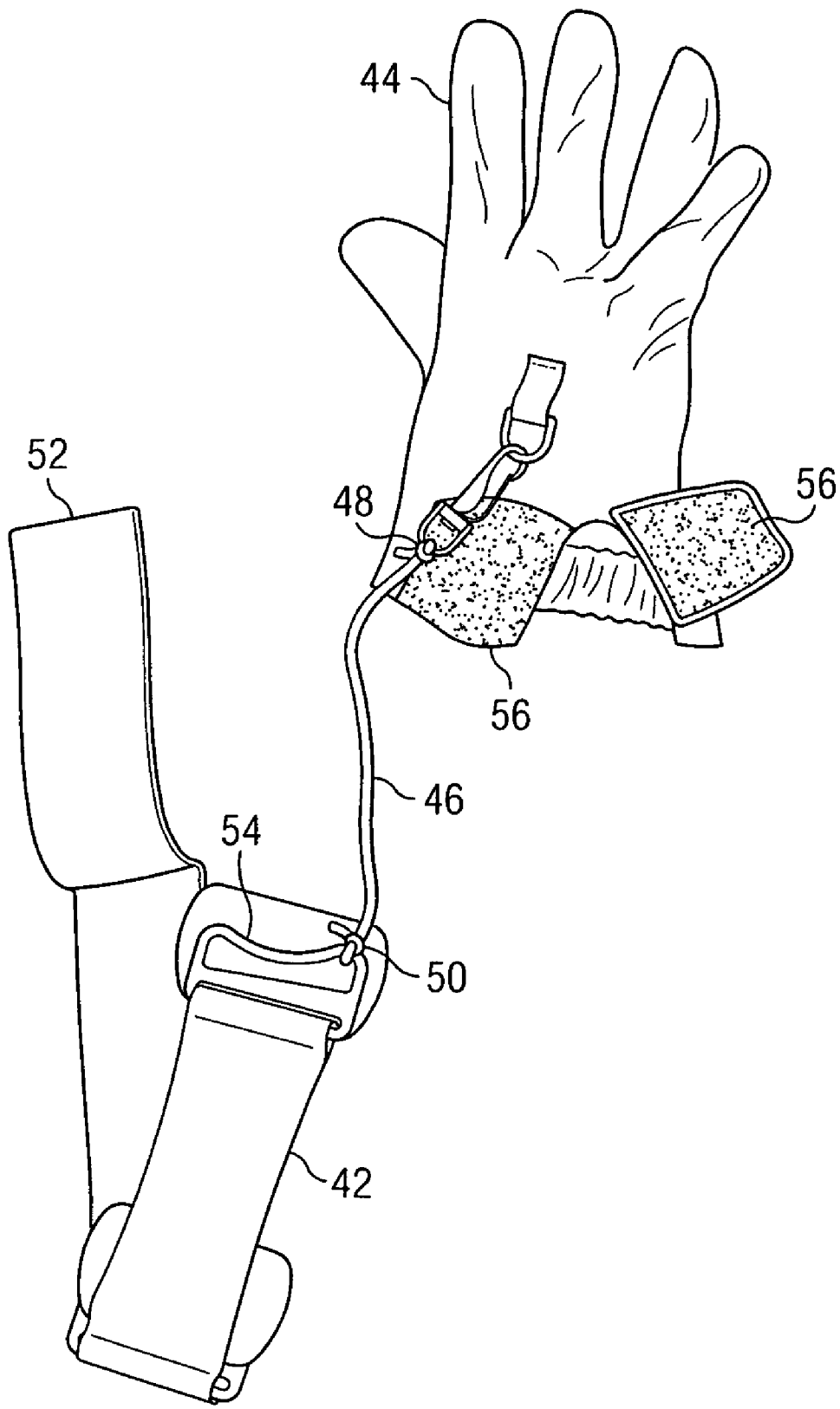
FIG. 4 is a perspective view of an embodiment of the training device of the present invention.

As illustrated in FIG. 4, in a preferred embodiment, the training device 40 has three (3) primary components: a band 42 adapted to be positioned on a user's arm above the user's elbow, a glove 44, and a means interconnecting the band and glove to maintain the user's wrist in a upwardly-extending, wrist-locked position with the user's elbow bent at or near a substantially 90° angle such that, during a practice stroke, the user's elbow remains in an elbow-bent position before, during and after contact with the tennis ball. The interconnecting means typically comprises a fixed or adjustable length tether, cord, cable, strap, or the like 46, having one end 48 attached, connected or secured to the glove (or to a fastener secured to or forming a part thereof), and an opposed end 50 attached, connected or secured to the upper arm (or to a fastener secured to or forming a part thereof). In this embodiment, the band 42 is adjustable by virtue of having an end 52 that is adapted to be received in the metal retainer 54 and secured in a conventional manner. Likewise, the glove 44 fit is adjustable using, in this example, the hook and loop fastener 56. Other known structures and arrangements for adjusting the fit of the band 42 and/or glove 44 are well known and within the scope of the present invention.

The tether's length may be fixed, or it may be adjustable through any convenient means. Of course, different users will have different arm lengths and, thus, it is desired to provide the tether in one or more lengths so that the training device can be fitted to the user's arm irrespective of the user's size.

The various components of the training device may be made of any suitable materials including leather, cloth, fabrics, plastics, webbing, composites, combinations, or the like. The tether typically will comprise a rigid high-strength plasticized material that will not stretch as a result of repeated use. Representative materials include coated or treated plasticized material such as nylon.

In general, any suitable hardware or other devices or arrangements (e.g., hooks, clips, locks, tighteners, restraints, welds, adhesives, or the like) may be used to provide adjustability for the one or more components of the training device.

Some users may not wish to wear a glove, which can interfere with the "feel" of the racket's grip. In such cases, and in lieu of the glove, the training device may include a wrist strap, with an additional cord attached at one end to the strap, with the cord extending up the palm, around the middle and ring fingers, and then down the back of the user's hand, where the cord is re-attached to the strap. The wrist strap is preferably adjustable, e.g., using a Velcro fastener or the like, and the main tether is attached to the wrist strap or to a piece of leather sewn into the wrist strap, either directly or through an intermediate fastener such as a hook.

Figure 5:
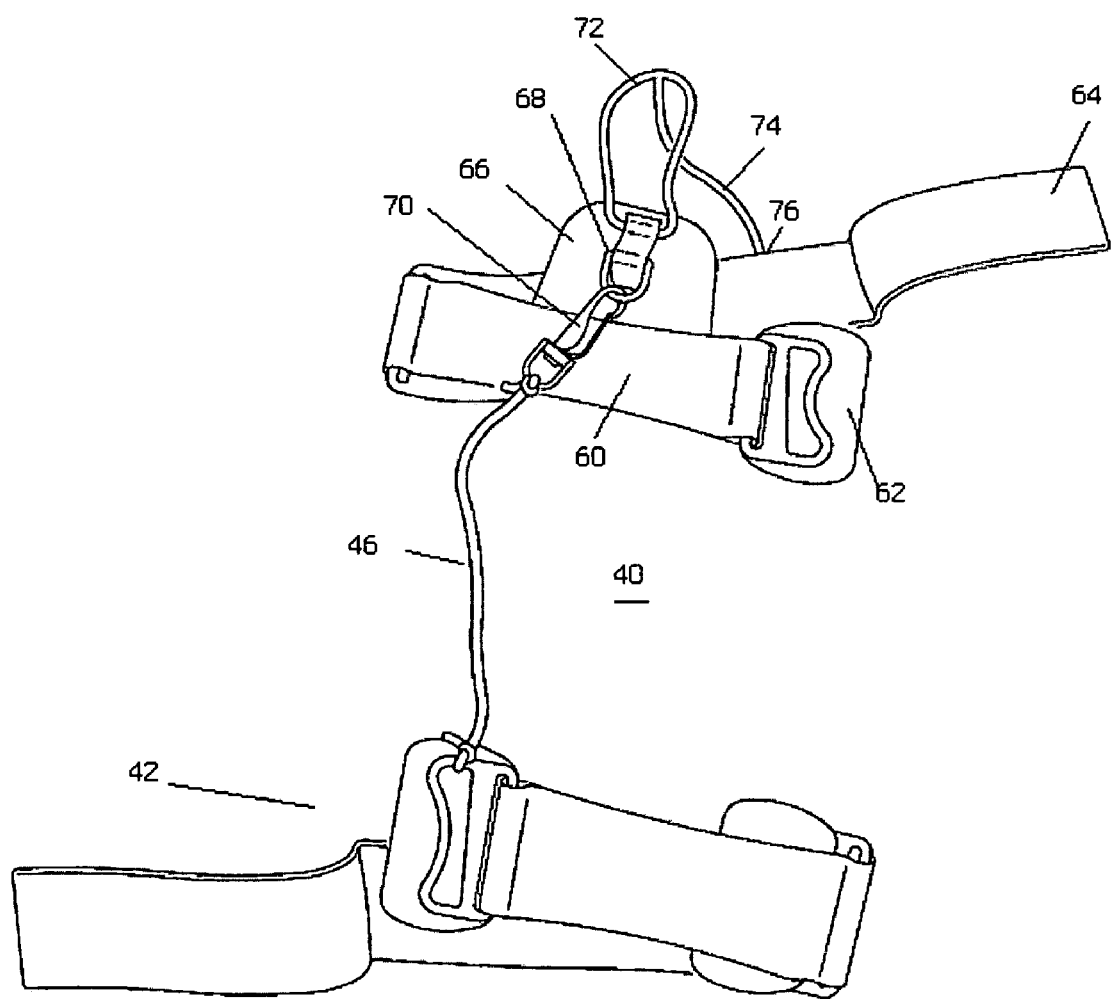
FIG. 5 is a perspective view of an alternate embodiment of the training device of the invention.

FIG. 5 illustrates an alternative embodiment. In this case, the training device 40 comprises arm band 42, as well as the connector 46 preferably made of an inelastic material. Instead of a glove, however, the device 40 includes a wrist band or strap 60 that is adapted to be worn around or adjacent the user's wrist. In this embodiment, the strap 60 comprises a retainer 62 at one end through which an opposed end 64 is received. Alternatively, the respective ends of the strap can be secured using Velcro or any other suitable arrangement (e.g., a buckle, a hook, or any other known fastener). The wrist band may be a continuous piece of flexible material that is simply pulled around the hand and worn in the nature of a sweat band or the like. A support patch 66 is preferably attached (e.g., by sewing) to the wrist band and is preferably formed of leather, cloth or other material that is comfortable to the user, as this patch is designed to rest on the back of the user's hand when the device is in use. As can be seen in FIG. 5, a ring 68 is attached to the support patch 66 and is used to receive an end of the tether, preferably in the form of a clip 70. If desired, the end of the tether can be attached directly to the ring 68. A loop 72 is attached to the support patch 66 and is designed to receive the user's middle and index fingers. The size of the loop may be varied so that one or more fingers can be received therein. An outer portion of the loop 72 is attached to palm connector 74 (e.g., a nylon cord formed of inelastic material) that has an end 76 attached to the wrist band. The position of the end 76 may be made adjustable so that the loop 72/connector 74 arrangement fits snugly around the user's hand. In effect, this arrangement forms a glove-less but comfortable fit for the user. There is little or no material in the user's palm (and little or no material on the user's fingers). This arrangement has been found to provide the user with a more natural feel during the training stroke but still maintains the support needed for the ring attachment. In use, the user attaches the wrist band to his or her racquet arm (i.e., the arm that handles the racket) and places his or her fingers in the loop 72. The extension 74 is then tightened or otherwise adjusted so that when the device (including the arm band) is positioned and used during the stroke, the user's wrist is maintained fixed in an upwardly-extending, wrist-locked position.

Other variants also are within the scope of the present disclosure. Thus, for example, the arm band need not be a discrete component but may be an extension of the tether. Likewise, the glove portion need not be a discrete component but may be an extension of the tether as well. The tether may be permanently attached to either the glove or arm band, and there is no requirement that three distinct components be used. Indeed, any pair of components (one supported on or about the user's wrist and the other supported on or about the user's upper arm) between which a tether is strung and that, together, maintain the user's wrist in an upwardly-extending, wrist-locked position, are suitable to "fix" the user's forehand stroke in accordance with the teachings of the present invention.

As discussed above, another design and objective of using the training device of the present invention is to train the user to produce forward rotation of the ball for better control. This objective is achieved by the forcing the player's elbow and wrist into the desired positions and relationship, as described above. As is well known, forward rotation of the ball allows the player to achieve net clearance first, then to bring the ball down into play in the court.

More generally, references in the written description to a given embodiment indicate that the embodiment described may include a particular feature, structure, or characteristic, but every embodiment may not necessarily include the particular feature, structure, or characteristic.

The training device of the present invention is adaptable for use for training users to improve their forehand stroke in other racquet sports including, without limitation, racquetball, squash, badminton, and the like.

I claim:

1. A racquet stroke training device, comprising:
   a first component adapted to be worn on a user's arm above the user's elbow;
   a second component adapted to be worn in association with a user's hand, the second component comprising a band, a support patch secured to the band and adapted to be maintained on a back portion of the user's hand, a loop attached to the support patch and adapted to receive at least one of the user's fingers, and a connector attached at a first end to the loop and a second end to the band; and
   a third component formed of inelastic material and having a first end attachable to the first component and a second end attachable to the support patch of the second component;
   wherein the third component has a given length such that, during a stroke, the training device maintains the user's elbow bent at or near a substantially 90° angle and maintains the user's wrist fixed in an upwardly-extending, wrist-locked position.

2. The racquet stroke training device as described in claim 1 wherein the first component is an adjustable band.

3. The racquet stroke training device as described in claim 1 wherein the third component is one of a tether, a cord, a cable and a strap.

4. The racquet stroke training device as described in claim 1 wherein the third component has an adjustable length.

5. The racquet stroke training device as described in claim 4 wherein the third component has a fixed length in use during the stroke.

* * * * *